3,733,305
CURABLE LOW SOFTENING EPOXY RESINS
CONTAINING BISPHENOL S
Peter Loewrigkeit, Wyckoff, and James C. Spitsbergen, Franklin Lakes, N.J., assignors to Witco Chemical Corporation, New York, N.Y.
No Drawing. Filed Feb. 3, 1971, Ser. No. 113,700
Int. Cl. C08g 30/00, 30/08
U.S. Cl. 260—49                                    7 Claims

ABSTRACT OF THE DISCLOSURE

Catalyst-free, curable, substantially linear thermosetting epoxy resins having low softening points and good melt viscosity stability, are made available by the reaction of a bis(hydroxyphenyl)sulfone (bisphenol S) with a bis(glycidyloxyphenyl)sulfone (diepoxy bisphenol S) in the hot molten state, without catalyst.

---

The present invention relates to the production of catalyst-free curable thermosetting all bisphenol S epoxy resins of high molecular weight in comminuted or powdered form for use as molding powders which can be stored indefinitely in bulk and used as needed. They may be heated to a curing temperature or treated with a curing agent and filled into a mold and heated, to effect curing of the composition. When curing by heat, for instance, the resin is melted for a period, and then cooled to form a hard solid body. Before curing, the material may be combined with pigments, powdered metals, asbestos, silica, glass fibers, and the like.

In particular, this invention provides for the production of high molecular weight catalyst-free, all bisphenol S soluble epoxy resin powders, for laminating, casting, molding and for making coatings, adhesives and the like, having the combination of low softening point and good melt viscosity stability. The epoxy resins of the present invention may be cured in the molten state at lower temperatures and remain fluid in the hot molten state for extended periods.

In the past, high molecular weight bisphenol S epoxy resins, such as are described in U.S. 3,364,178, issued on Jan. 16, 1968 to Kreps et al., and U.S. 2,765,322, issued Oct. 2, 1956 to Beavers, and in British Pat. 915,767, complete specification published Jan. 16, 1963 issued to Shell International Research, were prepared in the presence of an alkaline catalyst which remained in the product. The presence of catalyst in the final product contributes to branching and cross-linking of the product. In addition, products made by the known procedures possess poor melt viscosity stability, and generally tend to rapidly gel in the hot molten state.

According to the present invention, a diepoxy bisphenol S such as bis(4-glycidyloxyphenyl)sulfone having an average epoxy equivalent in the range of about 180–200 is heated to a melt and while in the hot molten state it is reacted with a quantity of bisphenol S, such as bis(4-hydroxyphenyl)sulfone, to produce a catalyst-free thermosetting resinous epoxy product having improved properties. The diepoxy bisphenol S used in the present process may be heated to a temperature at which it softens or it may be heated to higher temperatures (over the softening point) before adding the bisphenol S. The temperature at which the reaction takes place is only limited to practical considerations. A temperature of about 5–20° C. above the softening point of the diepoxy bisphenol S/bisphenol S mixture is convenient and is preferred.

The term "bisphenol S" as used herein includes all isomers of bis(hydroxyphenyl)sulfone. Likewise, "diepoxy bisphenol S" includes the isomers of bis(glycidyloxyphenyl)sulfone.

By the practice of the present invention, high molecular weight bisphenol S epoxy resins, i.e. molecular weight of more than about 500, are made available which are catalyst-free. In virtue of being catalyst-free, the products are more linear in configuration, have low softening points and may be kept in the molten state for prolonged periods during the curing process, without becoming overly viscous. These advantages are particularly demonstrated in substantially linear products having molecular weights of from about 500 to about 1000, which are the products of the reaction wherein from about 12 to 26% of bisphenol S is reacted with a diepoxy bisphenol S, based on the total weight of reactants. The present invention, however, may be utilized in the preparation of catalyst-free lower, and higher, molecular weight epoxy resins, but, as the molecular weight is increased, branching and cross-linking increases and the softening point of the products progressively increase. As the molecular weight is decreased, the products tend to crystallize. It is to be noted, however, that all the high molecular weight all bisphenol S epoxy resins, made as herein disclosed, contain terminal epoxy groups and thus are thermosetting, whether they are substantially linear, i.e. having a molecular weight of less than about 1000, or branched and cross-linked even higher molecular weight epoxy resins, and, as a result, all these epoxy resins may be cured by the known methods to form a wide variety of useful thermoset products.

Another important advantage of the present invention is in that the reaction may be conducted in the melt, without the use of solvents. However, solvents may be used in the process of the present invention, but are not recommended. Because of the relatively low order of solubility of the diepoxy bisphenol S, undue amounts of solvent generally must be used, and later removed, adding to the overall cost of the process. The all-bisphenol S catalyst-free products, however, are generally soluble in solvents such as acetone, N-methyl pyrrolidone, and cyclohexanone, the degree of solubility increasing with increased molecular weight up to a molecular weight of about 1000.

When the reaction between bisphenol S and a diepoxy bisphenol S is conducted with or without solvent, using even a mild catalyst such as lithium hydroxide, fast gelling takes place, and excessive branching and cross-linking occur as evidenced by the high epoxy equivalents of the viscous products particularly when heated. Similar cross-linking and branching occur when the high molecular weight epoxies are prepared directly from the reaction of bisphenol S with epichlorohydrin in the presence of an alkali, as known in the art. The highly viscous products from these reactions possess less useful thermosetting properties, as stated above.

The diepoxy bisphenol S, which is used in the reaction of the present invention, is the product of the reaction of bisphenol S with epichlorohydrin and has a theoretical epoxy equivalent of 181 (molecular weight 362), represented by the following formula:

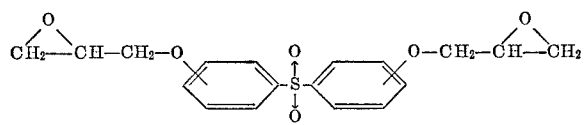

The above diepoxy bisphenol S may be prepared by any of the known methods, for instance, as described in U.S. 2,765,322, issued Oct. 2, 1956 to Beavers and 3,417,050, issued Oct. 17, 1968 to Price et al., the latter method being preferred.

Isomers of the above epoxy resin, such as the 2,4′-diepoxy isomer may be used, as well as mixtures of isomers, in the preparation of the thermosetting resins of the present invention.

Illustrative of the practice of the present invention using the 4,4'-diepoxy isomer, having a melting point of about 165–168° C., the diepoxide is heated to a temperature sufficient to produce a melt, such as about 170° C. or higher, then treated with a quantity of bisphenol S, the quantity depending upon the desired epoxy equivalent of the product. For instance, if a product having an epoxy equivalent of about 300 (M.W. 600) is desired, about 14% of bisphenol S, based upon the total weight of reactants, is used. Alternately, the bisphenol S may be added to the solid diepoxide and the mixture heated to a melt. Due to the heat of reaction and depending on the size of the reaction mixture, the temperature may increase considerably. For instance, a molten reaction mixture of 8 pounds of 4,4'-diepoxy bisphenol S and 2 pounds of 4,4'-bisphenol S, increases from 170° C. to 250° C. as a result of the heat of reaction. After about 10–15 minutes of reaction, the mixture is cooled to room temperature to yield the epoxy resin product which may be stored as is or comminuted and stored for future use.

The catalyst-free epoxy resins of the present invention may be cured with an anhydride such as Nadic methyl anhydride (methyl 4-endomethylene tetrahydrophthalic anhydride) in the hot melt, or with an aromatic amine such as methylene dianiline, as is broadly known, per se, to produce useful thermoset products. The melt viscosity stability of the present catalyst-free epoxy resin products is a valuable property, particularly useful in large scale curing under production conditions, where often it becomes necessary to hold a resin in the hot molten state for extended periods, as for instance in preheated systems, before it is treated with a curing agent such as Nadic methyl anhydride. Because of the inherent melt viscosity stability, the present epoxy resins remain fluid for extended periods in the hot molten state, whereas, analogous products containing catalyst become sharply very viscous and solidify and thus are rendered useless for the intended purpose.

The following examples illustrate specific embodiments of the present invention and are not intended to limit the invention thereto.

EXAMPLE 1

About 2,580 grams of bis(4-glycidyloxyphenyl)sulfone having an average epoxy equivalent of about 185 is heated to 190° C. in a 5 liter 3-neck flask equipped with an air condenser, stirrer and thermometer. This is followed by charging 420 grams (14% of total weight of reactants) of bis(4-hydroxyphenyl)sulfone into the flask while stirring. After all reactants are molten, the temperature increases to 240° C. due to heat of reaction. It is then stirred while hot for about 10 minutes, then poured onto aluminum foil and cooled to room temperature. The resulting low softening resin has an acid number of less than 5, an epoxy equivalent of about 302, a Durrans softening point of 90° C. and a melt viscosity of 5,400 cps. at 130° C. as determined using a Brookfield viscometer.

EXAMPLE 2

A product having an epoxy equivalent of about 264 is prepared using 12% bisphenol S as in Example 1.

EXAMPLE 3

A product having an epoxy equivalent of about 264 is prepared as in Example 2 using a catalytic amount of lithium hydroxide.

The following table illustrates the melt viscosity stability of the catalyst-free resin product of the present invention of Example 2 above, when compared with the analogous catalyst containing resin product of Example 3, above, at 170° C., over a 4 hour period. Viscosities were measured with a Brookfield viscometer.

|  | Epoxy resin product of Example 2 (no catalyst) c.p.s. | Epoxy resin product of Example 3 (LiOH catalyst) c.p.s. |
|---|---|---|
| Initial viscosity (170° C.) | 200 | 200 |
| Viscosity after: |  |  |
| 60 min | 300 | 325 |
| 120 min | 400 | 710 |
| 140 min | 420 | >800 |
| 160 min | 475 | (1) |
| 180 min | 500 | |
| 240 min | 550 | |

[1] Resin is unmanageably viscous.

EXAMPLE 4

A product is prepared as in Example 1 using 8 pounds of bis(4-glycidyloxyphenyl)sulfone and 2 pounds (20% of total weight of reactants) of bis(4-hydroxyphenyl)sulfone containing about 10% 2,4'-hydroxy isomer. The product has an average epoxy equivalent of about 415 and a Durrans softening point of about 114° C. It is soluble in acetone, cyclohexanone and N-methylpyrrolidone.

We claim:

1. Substantially linear thermosetting bis(hydroxyphenyl)sulfone epoxy resins comprising the reaction product of a bis(glycidyloxyphenyl)sulfone having an average epoxy equivalent in the range of about 180–200 in the hot molten state with about 12%–26%, based on the total weight, of a bis(hydroxyphenyl)sulfone, without catalyst.

2. A product as in claim 1 wherein the bis(hydroxyphenyl)sulfone is predominantly the bis(4-hydroxyphenyl)sulfone.

3. A product as in claim 1 wherein the bis(glycidyloxyphenyl)sulfone is predominantly bis(4-glycidyloxyphenyl)sulfone.

4. A product as in claim 1 wherein the bis(hydroxyphenyl)sulfone is predominantly 2,4'-dihydroxyphenyl sulfone.

5. A product as in claim 1 wherein the bis(glycidyloxyphenyl)sulfone is predominantly 2,4'-diglycidyloxyphenyl sulfone.

6. A product as in claim 1 wherein the bis(hydroxyphenyl)sulfone, is a mixture of 2,4'- and 4,4'-dihydroxyphenyl sulfone.

7. A product as in claim 1 wherein the bis(glycidyloxyphenyl)sulfone is a mixture of 2,4'- and 4,4'-diglycidyloxyphenyl sulfone.

References Cited
UNITED STATES PATENTS

| 2,503,726 | 4/1950 | Greenlee | 260—613 |
| 2,592,560 | 4/1952 | Greenlee | 260—47 |
| 3,051,084 | 8/1962 | Scheibli | 260—37 |
| 3,379,684 | 4/1968 | Wiesner et al. | 260—47 |
| 3,364,178 | 1/1968 | Kreps et al. | 260—49 |
| 3,177,089 | 4/1965 | Marshall et al. | 117—72 |

WILLIAM H. SHORT, Primary Examiner

L. L. LEE, Assistant Examiner

U.S. Cl. X.R.

260—30.2, 32.8 EP, 37 EP, 47 EP, 47 EA, 47 EN